United States Patent

[11] 3,593,705

| [72] | Inventors | Randal Howard Thomas<br>Oreland;<br>Mary Louise Torchiana, Ambler, both of, Pa. |
|---|---|---|
| [21] | Appl. No. | 766,034 |
| [22] | Filed | Oct. 3, 1968 |
| [45] | Patented | July 20, 1971 |
| [73] | Assignee | Merck & Co., Inc.<br>Rahway, N.J. |

[54] ARRHYTHMIA MONITORING INSTRUMENT AND METHOD USING "NORMAL" AND "TOTAL" COUNTING CHANNELS
14 Claims, 12 Drawing Figs.

[52] U.S. Cl. ............................................. 128/2.06 A
[51] Int. Cl. ............................................. A61b 5/04
[50] Field of Search .................................. 128/2.05
M, 2.05 P, 2.05 S, 2.06 R, 2.06 A, 419 P

[56] References Cited
UNITED STATES PATENTS

| 3,030,946 | 4/1962 | Richards | 128/2.06 |
|---|---|---|---|
| 3,171,892 | 3/1965 | Pantle | 128/2.05 X (M) |
| 3,253,596 | 5/1966 | Keller, Jr. | 128/419 UX (P) |
| 3,267,933 | 8/1966 | Mulls et al. | 128/2.06 |
| 3,267,934 | 8/1966 | Thornton | 128/2.06 |
| 3,280,817 | 10/1966 | Jorgensen et al. | 128/2.05 (S) |
| 3,318,303 | 5/1967 | Hammacher | 128/2.05 (S) |
| 3,352,300 | 11/1967 | Rose | 128/2.06 |
| 3,438,368 | 4/1969 | Karsh | 128/2.06 |
| 3,478,746 | 11/1969 | Greatbatch | 128/419 UX (P) |
| 3,499,435 | 3/1970 | Rockwell et al. | 128/2.05 (M) |

*Primary Examiner*—William E. Kamm
*Attorneys*—Reverdy Johnson, I. Louis Wolk and Harry E. Westlake ABSTRACT: Monitoring apparatus and method for determining the presence of cardiac arrhythmias by means of pattern recognition techniques applied to each successive electrical heart cycle as represented by derived electrocardiogram waves; the total number of electrical cycles undergone by the derived electrocardiogram waves is ascertained in a first circuit and the number of cycles having predetermined normal characteristics during the occurrence of the total number of electrical cycles is derived in a second circuit; the outputs of the first and second circuits are fed to an indicator which indicates the presence of the arrhythmia.

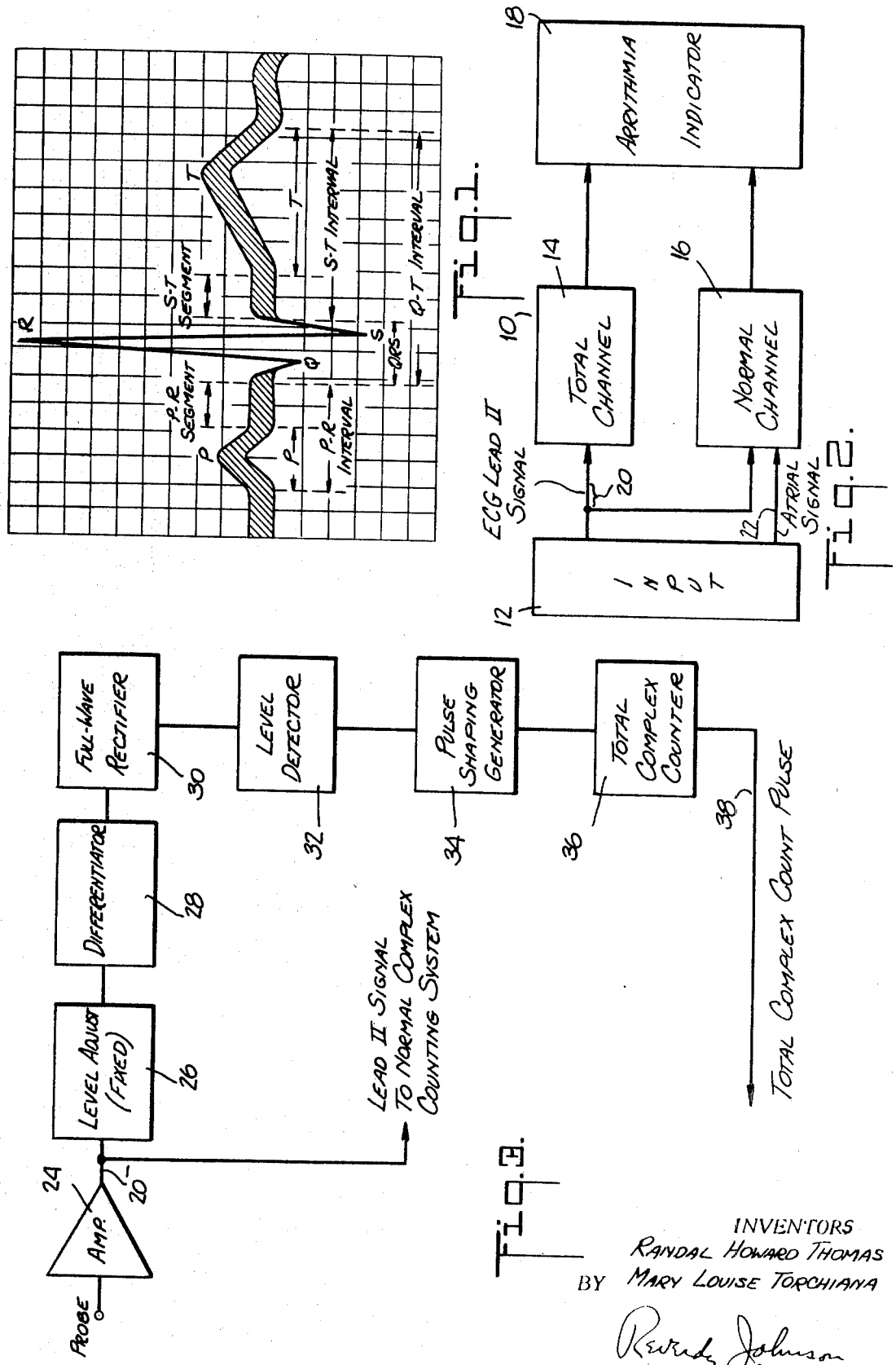

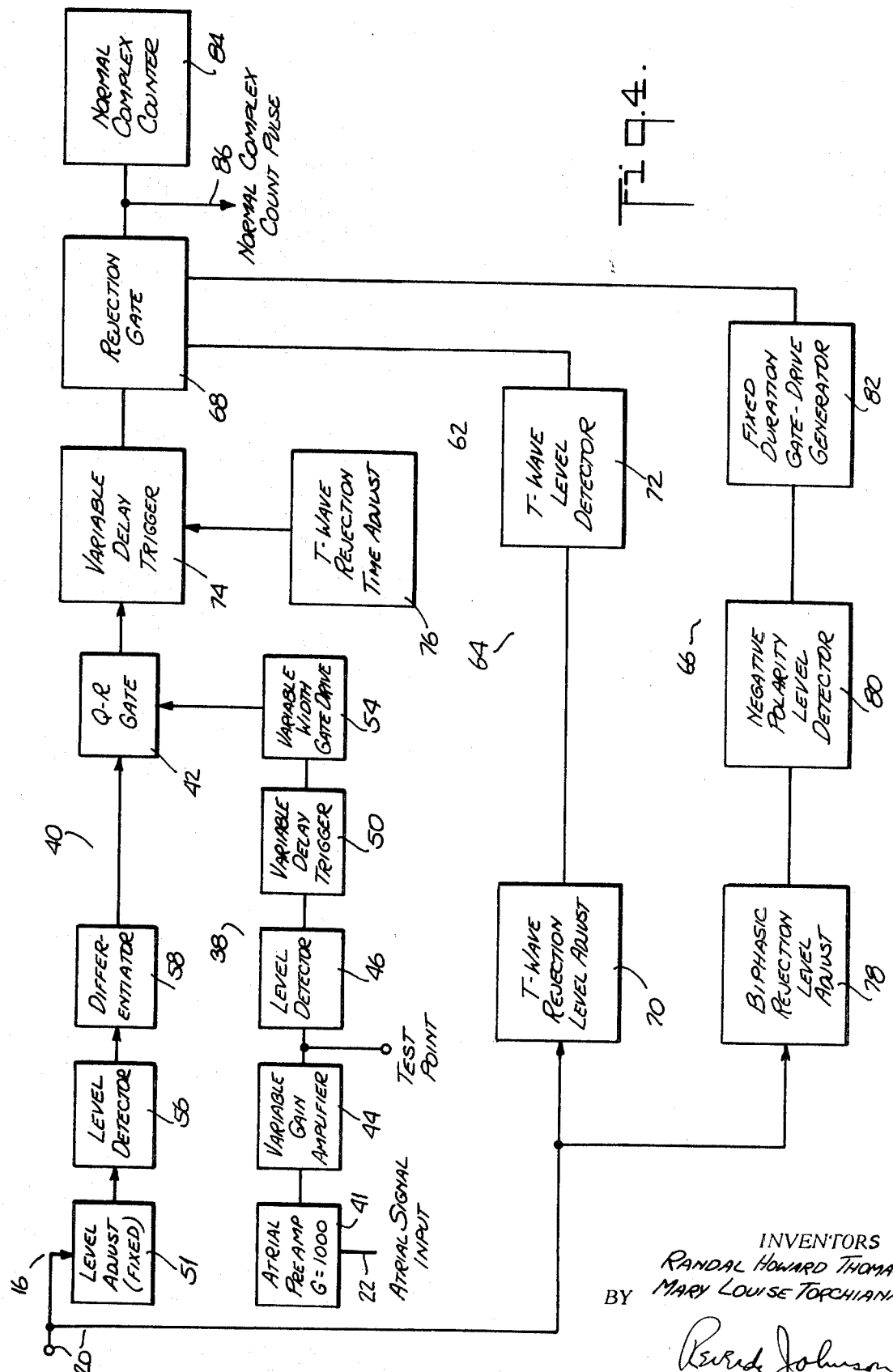

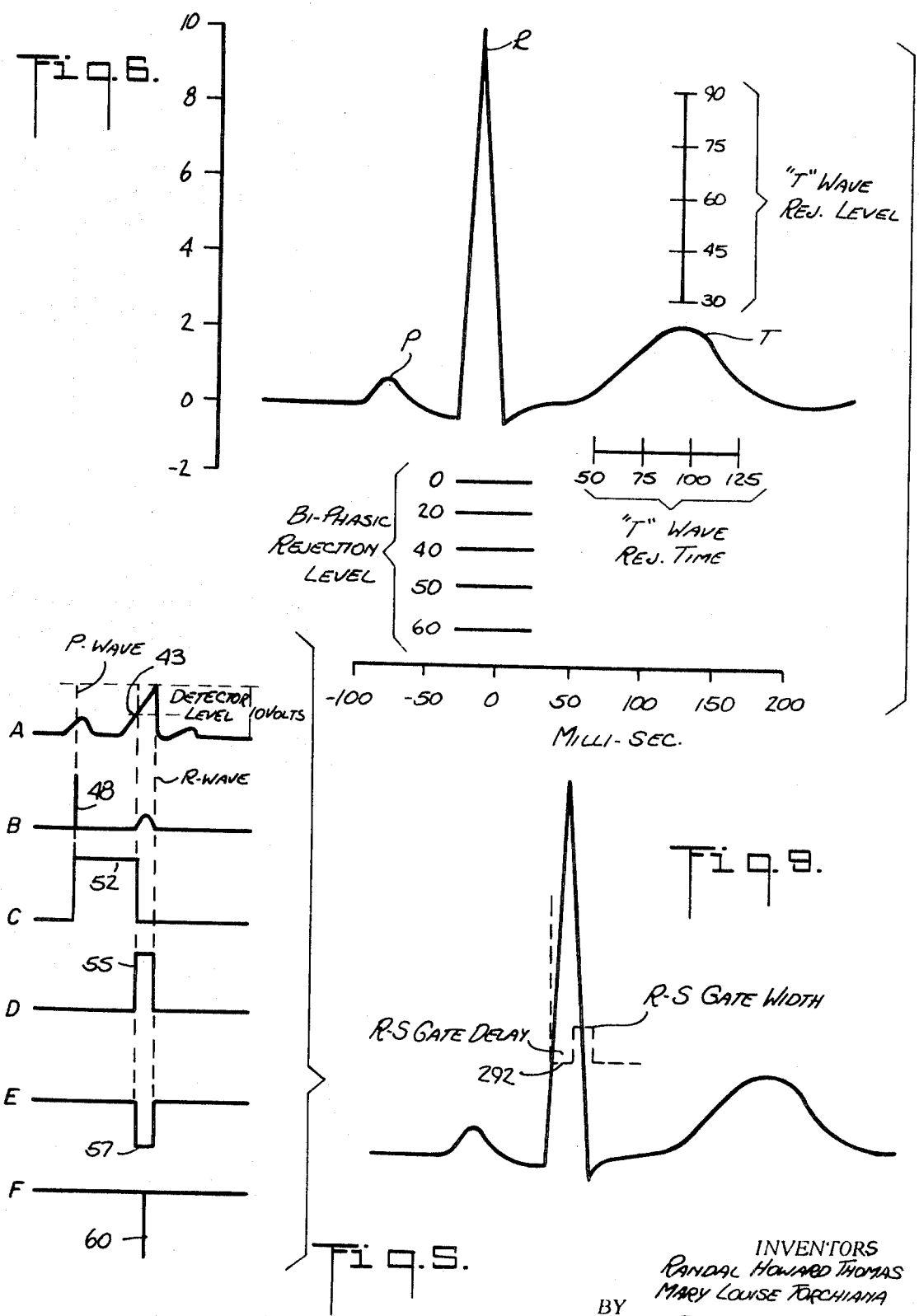

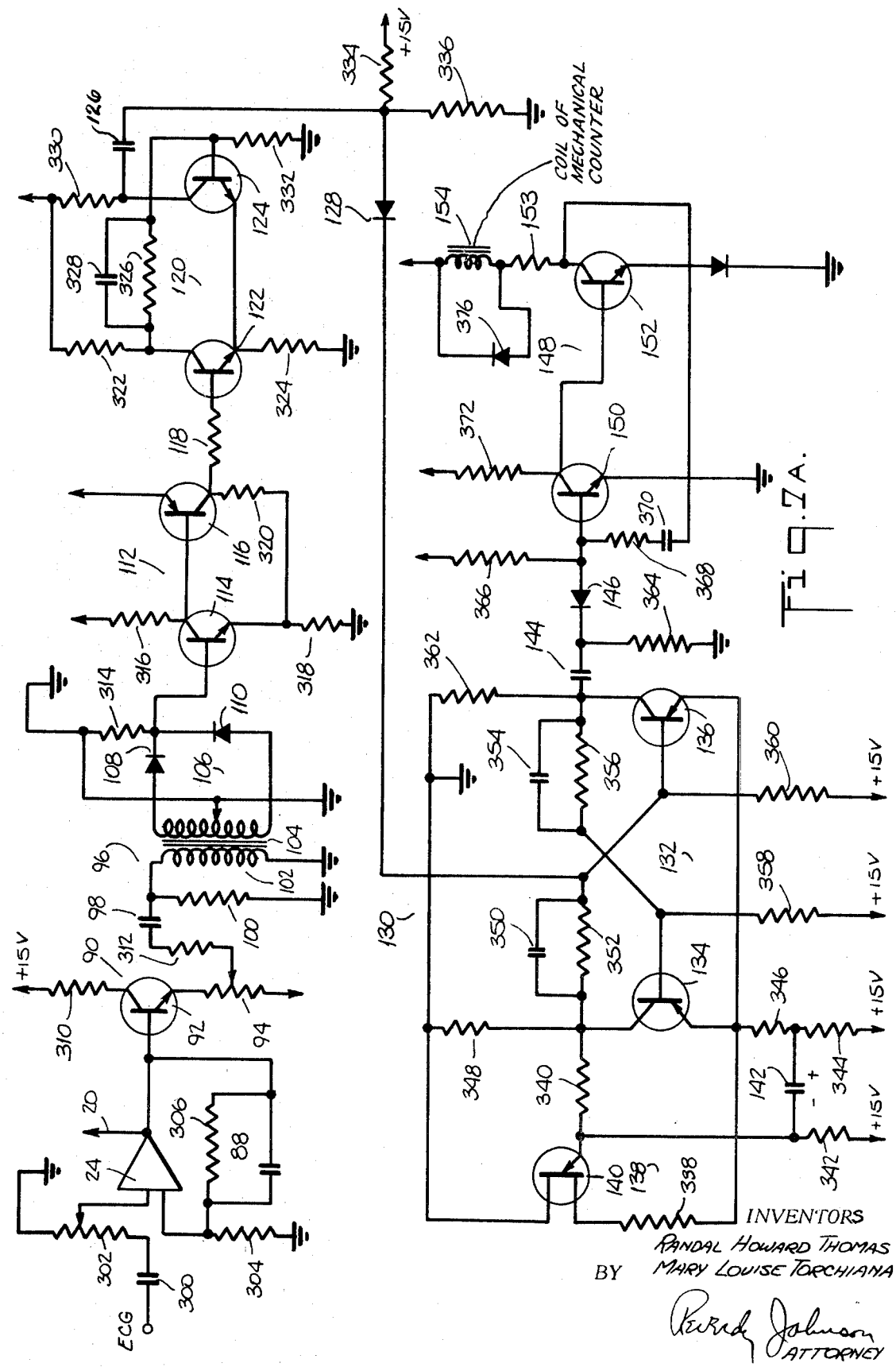

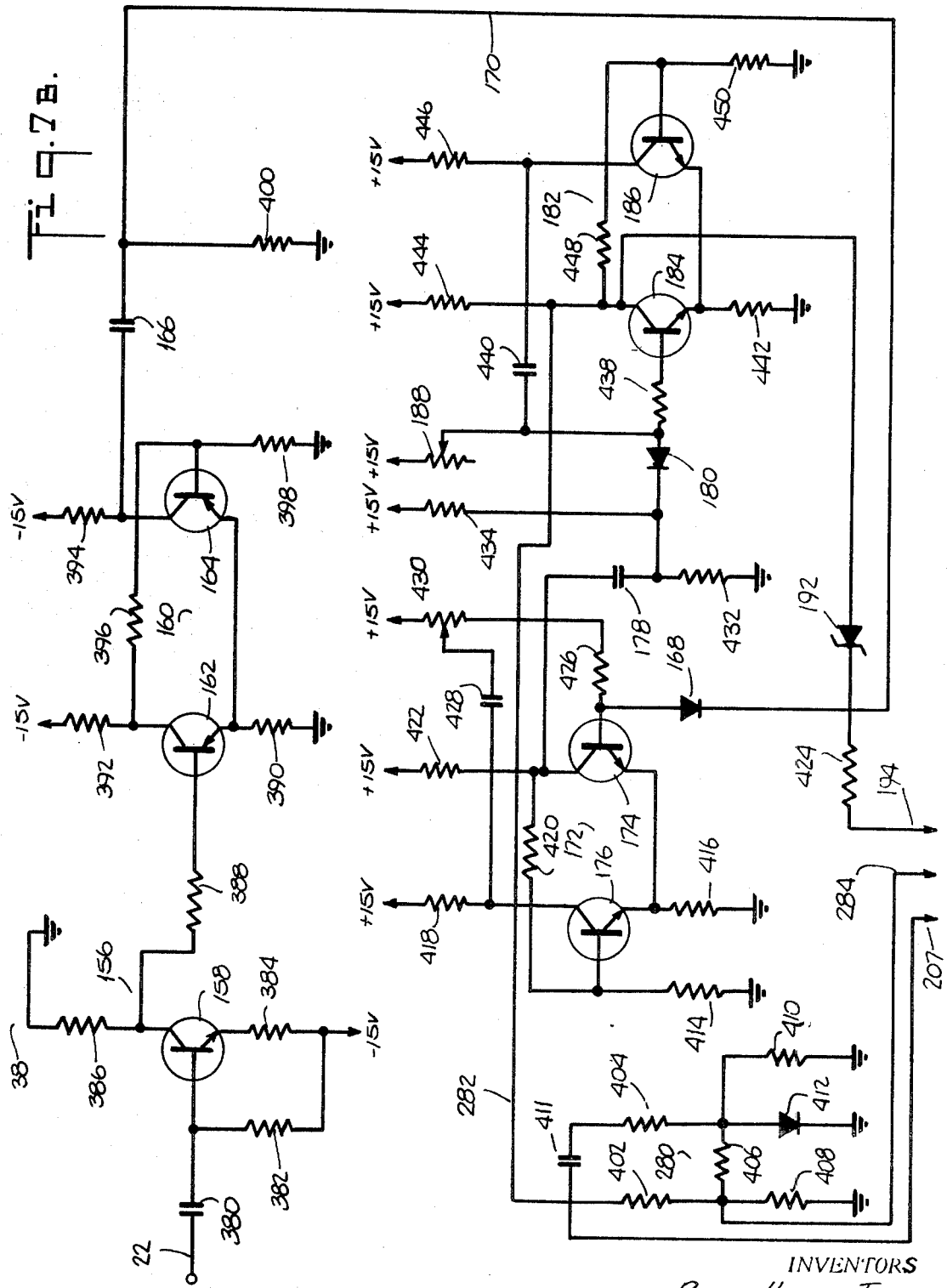

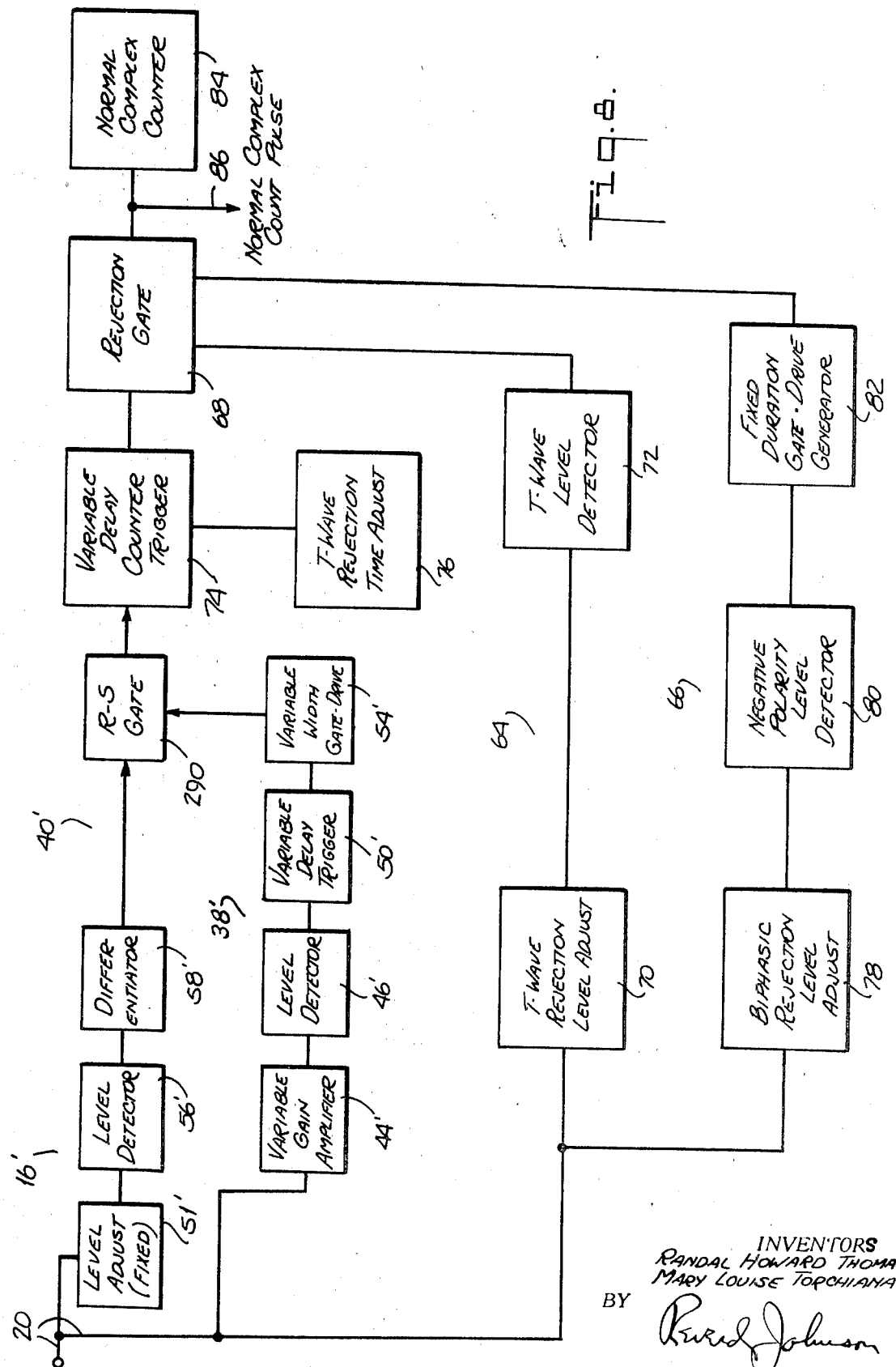

ARRHYTHMIA MONITORING INSTRUMENT AND METHOD USING "NORMAL" AND "TOTAL" COUNTING CHANNELS

This invention relates to an apparatus for and method of monitoring cardiac activity and, more particularly to an apparatus for and method of determining the presence and rate of occurrence of cardiac arrhythmias in higher forms of life.

While the present invention has a wide range of applications, it is particularly useful in connection with ventricular arrhythmias and will be described in that connection.

The condition of ventricular arrhythmias is a temporary or permanent change in the normal electrical rhythm of the heart which is noted in higher forms of life, particularly the larger mammals including dogs, horses, cattle and man. This disturbance in normal electrical rhythm of the heart of the affected mammal may arise spontaneously without apparent cause or it may result from a serious heart condition. Depending on the particular type of ventricular arrhythmia present, such as for example ectopic beats, tachycardia, flutter, and fibrillation, the arrhythmia may vary from a momentary effect which will spontaneously be corrected or, in extremely acute cases, may result in almost instantaneous death. Generally speaking, most ventricular arrhythmias, regardless of duration, save ventricular fibrillation, are characterized by bizarre or premature QRS-complexes and are associated with QRS-intervals of variable duration.

The success in diagnosis and treatment of ventricular arrhythmias and the success in researching the value of therapeutic measures used in such treatment, both depend in some degree on proper analysis of the presence and the rate of occurrence of the ventricular arrhythmia. This, of course, requires the counting of a large number of electrical heart cycles and deciding, on a cycle by cycle basis, which of them is normal. To date, no satisfactory and simple apparatus and method have been brought forward which reliably and inexpensively perform this task.

According to one method, an electrocardiogram of the mammal, preferably lead II, is recorded on electrocardiographic paper during selected sampling intervals of a test period and, based on the observations of the resultant record by a skilled technician, both the total and normal complexes or patterns are recognized and determined for each of the sampling intervals. The data from each sampling interval is then used to determine both the number of average total complexes and the number of average normal complexes which occurred during the test period. The presence and rate of occurrence of the arrhythmia is then determined from the ratio of these averages in the usual manner. While this method has proved satisfactory in some instances, it does not have the operational simplicity required for immediate and successful diagnosis and treatment of ventricular arrhythmias. Not only is this method of determining the presence and rate of occurrence of ventricular arrhythmias tedious and time consuming, especially when large amounts of electrocardiogram data are involved, but also it does not always detect the effects of brief ectopic beats which occur during the unsampled intervals. In addition, the success of this method, in the main, depends on the skills and detailed observations of the electrocardiogram operator.

In addition to the above, other methods of determining the presence and rate of occurrence of ventricular arrhythmia from electrocardiograms have been devised which automatically carry out the pattern recognition process and indicate the results. In the main, these methods require large digital computers having extensive storage facilities, as well as require an analogue to digital converter for translating the electrocardiogram waves into digital bits recognizable by the computer, and a sophisticated computer program for instructing the computer in carrying out the required pattern recognition of the electrocardiogram waves. These methods are very complicated and require skilled computer operators. In addition, these methods are very expensive to realize, and thus are not suitable for use in individual research laboratories, hospitals, doctors' offices, and the like where space and economy are of prime importance. Other methods, utilizing analogue computers, have also received passing interest, but many have been found to suffer essentially the same drawbacks as those which utilize digital computers.

In accordance with the present invention, there is provided a small, essentially portable and inexpensive apparatus and related method for monitoring the presence and rate of occurrence of ventricular arrhythmia which are capable of online operation and which have operational simplicity and reliability not demanding highly skilled operators.

In accordance with one aspect of the present invention, the monitoring apparatus for determining the presence of cardiac arrhythmias includes input means for supplying waves corresponding to cardiac electrical activity at least during ventricular depolarization. Two channels, hereafter referred to as the total and normal channels, are coupled to the input for analyzing complexes of the input waves and for providing output signals corresponding to the number of total and normal cardiac cycles analyzed, respectively. In addition, indicator means, such as electromechanical counters responsive to the outputs of the total and normal channels, are provided for conveniently indicating the presence of cardiac arrhythmias.

The total channel operates on the assumption that one complete electrical cycle of electrical cardiac activity is usually indicated by the occurrence of that portion of the input of electrocardiogram wave commonly associated with ventricular depolarization. This portion of the electrocardiogram wave is commonly referred to as the QRS-complex. Thus, the total channel includes circuit means coupled to the input for supplying an indicator actuating output upon the occurrence of waves having amplitude and rise time typical of ventricular depolarization. As illustratively embodied, the occurrence of such waves is identified by the presence of a R-wave having predetermined characteristics. In the preferred form, the total channel may comprise wave-differentiating means and wave-amplitude-level-detecting means, the time constant of the wave differentiating means and the level of the amplitude level detecting means being related to the rise time and amplitude of waves typical of ventricular depolarization. Also, rectifier means, such as a full-wave rectifier, is utilized to couple the differentiating means and the wave-amplitude-level-detecting means together.

The normal channel operates on the thesis that since most ventricular arrhythmias are characterized by abnormal ventricular depolarization, and thus by abnormal R-waves in the waves supplied by the input, normal input waves are indicated by proper succession at normal intervals of waves corresponding to atrial and ventricular depolarization, respectively. Thus, the normal channel includes circuit means coupled to the input for supplying an indicator-actuating output upon the occurrence near the end of a predetermined interval of waves having amplitude and rise time typical of ventricular depolarization.

In one preferred form, the input supplies to the normal channel, waves corresponding to both atrial and ventricular depolarization, the waves corresponding to atrial depolarization being preferably derived by a separate atrial lead; and the predetermined interval corresponds closely to the normal interval between atrial and ventricular depolarization of cardiac electrical activity. In this form, the circuit means of the normal channel includes first detecting means for providing a control output upon the occurrence of waves having rise time and amplitude typical of atrial depolarization, and also includes second detecting means for providing an actuating output upon the occurrence of waves having rise time and amplitude typical of ventricular depolarization. In addition, the circuit means of the normal channel includes gate means which translate the actuating output of the second detecting circuit to the indicator of the monitoring apparatus, and which is controlled in response to the control output of the first detecting means.

Delay means, coupled to the first detecting means and correlated to the mentioned predetermined interval, is also included for actuating the gating means in response to the output of the first detecting circuit whereby the gate means is operated within the normal interval after occurrence of waves typical of atrial depolarization and the output of the gate means provides a reasonable indication whether or not the analyzed wave pattern is normal.

In another form, the input supplies to the normal channel, waves corresponding to ventricular depolarization, and the predetermined interval of the normal circuit means relates to a width measured between predetermined amplitudes of waves corresponding to ventricular depolarization. As illustratively embodied, the wave chosen as best meeting this requirement is the R-wave. Stated another way, the normal channel in this preferred form operates upon the proposition that the characteristic most apt to successfully identify normal cycles is the R-wave width measured between predetermined amplitudes above the baseline. In this form, the preferred circuit means of the normal channel would include first detecting means for providing a control output upon the onset of waves typical of ventricular depolarization i.e. onset of R-waves and having a predetermined amplitude. Also, second detecting means is provided to derive an actuating output at a time corresponding to the expected normal fall of the waves to the same or another predetermined amplitude. Gate means, responsive to the control output of the first detecting means, is also included for translating the indicator actuating output of the second detecting means to the indicator of the monitoring apparatus whenever the output of the second detecting means occurs within the mentioned predetermined interval after the onset of ventricular depolarization.

In accordance with another aspect of the present invention, reject circuit means is utilized to couple the output of the normal channel to the indicator, and operates to reject outputs of the normal channel upon the occurrence in the input waves of amplitude characteristics exceeding predetermined limits. Specifically, the reject circuit means operates to reject indicating outputs of the normal channel corresponding to input waves having either or both predetermined excessive biphasic and T-amplitude characteristics even though these input waves are indicated as normal by the normal channel. Thus, the reject circuit means includes gate means for coupling the output of the normal circuit to the indicator of the monitoring apparatus, and first and second amplitude-level-detecting means which are coupled to the mentioned input and which are constructed to operate the gate means when the amplitude of input waves exceed predetermined biphasic and/or T-wave levels.

In accordance with another aspect of the present invention, a novel procedure is provided for determining the presence of cardiac ventricular arrhythmias. The procedure includes detecting electrocardiogram waves corresponding to cardiac electrical activity, including atrial and ventricular depolarization, and determining from these waves the number of complete electrical cycles the waves undergo as well as the time of occurrence of both atrial and ventricular depolarization. Thereafter, the number of times that ventricular depolarization follows within a normal or predetermined interval of atrial depolarization is determined, and the percent of normal complexes included therein is determined. Numerous steps may be used in detecting the waves corresponding to atrial depolarization. Besides the use of a normal electrocardiogram lead signal, separate atrial leads may be used. Thus, for example, an atrial lead may be positioned by surgical methods directly on atrium, or percutaneously; or alternatively an esophageal lead may be used to obtain the required atrial signal.

There have thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structure for carrying out the several aspects of the invention.

Specific embodiments of the invention have been chosen for purposes of illustration and description, and are shown in the accompanying drawings forming a part of the specification wherein:

FIG. 1 is a labeled normal electrocardiogram wave helpful in understanding the terminology and background of the present invention;

FIG. 2 is a schematic diagram broadly illustrating the overall features of a monitoring apparatus for indicating the presence of cardiac arrhythmias constructed in accordance with the present invention, and showing the relative cooperation between the total and normal channels utilized to indicate the state of cardiac arrhythmias;

FIG. 3 is a schematic diagram showing the operation of the total channel utilized in the monitoring apparatus schematically shown in FIG. 2;

FIG. 4 is a schematic diagram showing the operation of the normal channel utilized in the monitoring apparatus schematically shown in FIG. 2;

FIG. 5 shows a plurality of time related waveforms explaining the operation of the normal channel schematically shown in FIG. 4;

FIG. 6 shows a labeled electrocardiogram wave which explains the operation of the T-wave and biphasic rejection features of the normal channel schematically shown in FIG. 4;

Figure 7C:
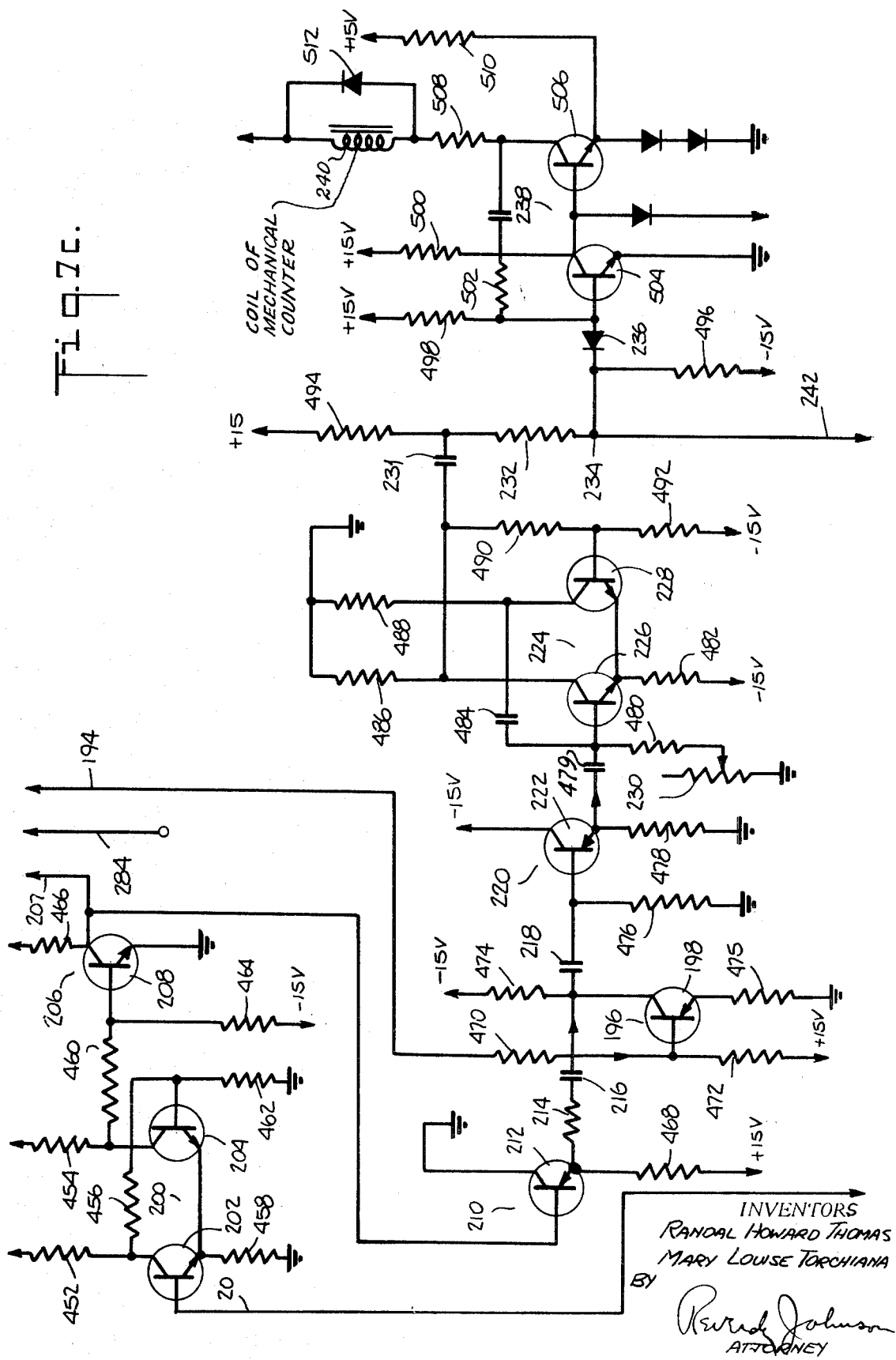
FIG. 7A is a schematic circuit diagram of the total channel shown in FIG. 3.

FIGS. 7B, 7C, and 7D when turned on their side and joined show a schematic circuit diagram of the normal channel shown in FIG. 4;

FIG. 8 is a schematic diagram showing the operation of an alternate normal channel constructed in accordance with the present invention; and FIG. 9 is a waveform which partially explains the operation of the normal channel schematically shown in FIG. 8.

TERMINOLOGY

In order to establish bases for the terminology used herein, a brief explanation of the physiological phases of cardiac activity and of the electrocardiograms is in order. Potentials arising in the heart of mammals and the like, are quite significant in the diagnosis and treatment of arrhythmias. These potentials when recorded, commonly referred to as electrocardiograms, reveal their sites of origin, their degree of electrical rhythm and their conduction routes, thus providing a good estimate as the the electrical condition of the heart. It will be noted, however, that generally electrocardiograms yield no information as to heart valve or heart contractual actions, but rather indicate only the electrical activity of the heart. FIG. 1 shows a typical normal electrocardiogram complex obtained from two body surface electrodes connected between the right arm and left leg, and conventionally referred to by those skilled in the art as a lead II record or waves. As shown therein, the first significant potential encountered in the cardiac electrical cycled is the P-wave. The P-wave arises from atrial depolarization, and generally is upright or positive in the lead II record for a duration of anywhere between 80 to 100 milliseconds in humans. After the occurrence of the P-wave, and during what is commonly referred to as the P-R segment, no gross recordable electrical changes occur near the heart surface, but nonetheless, electrical excitation is traversing within the endocardium to the epicardium surface. Then, as shown in FIG. 1, the QRS-complex, which arises from ventricular depolarization, occurs and generally has an interval lasting about 100 milliseconds in humans. The R-wave component of the QRS-complex has by far the greatest potential level since it represents the massive breakthrough of electrical excitation through the epicardium surface. Following the occurrence of the QRS-complex, the S-T segment occurs during which the entire epicardium surface is depolarized. Thereafter, the ventricles repolarize and as this occurs, potential differences in the form of T-waves occur.

When, however, the heart has a ventricular arrhythmatic condition, the above described electrical characteristics of the heart are changed and, in the main, waves corresponding to electrical activity of the affected heart are characterized by bizarre or premature QRS-complexes with reference to the occurrence of atrial depolarization and have prolonged QRS-intervals. It is the former characteristic, i.e. bizarre or premature QRS-complexes which is utilized to great advantage in the present invention to determine whether or not input waves are normal and thus to determine the presence of cardiac ventricular arrhythmia. The term normal as used herein refers to any predetermined condition or degree of the analyzed wave.

EMBODIMENT OF FIGS. 2—7

General Organization

Referring first to FIGS. 2—7, and specifically to FIG. 2, there is shown in schematic form, a monitoring apparatus, shown generally at 10, constructed in accordance with the present invention for determining the presence and rate of occurrence of ventricular cardiac arrhythmias. As shown, the apparatus 10 includes an input 12 for supplying waves corresponding to the above described cardiac electrical activity, and also includes a total channel 14 and a normal channel 16, both of which are connected to an indicator means 18 which indicates the state of cardiac ventricular arrhythmia. The total channel 14 identifies the total number of electrical cycles which the heart undergoes, and the normal channel 16 identifies the number of electrical cycles having normal electrical rhythm. The indicator 18 preferably simultaneously sums and visually indicates both the number of electrical cycles having normal rhythm and the total number of cycles undergone by the heart during the occurrence of the normal cycles thus providing data whose ratio indicates the presence and rate of occurrence of ventricular arrhythmia. Of course, indicator 18 may directly determine and visually indicate this ratio as well as include other audible and visual means for indicating the presence of ventricular arrhythmia. In addition, indicator 18 may include a synchronized printer for periodically recording all mentioned visual data along with a time reference thereby showing the rate of ventricular arrhythmia at a glance.

The input 12 supplies, preferably by two separate leads, waves corresponding to both atrial and ventricular depolarization. As shown in FIG. 1, waves corresponding to ventricular depolarization are coupled via lead 20 to both the total channel 14 and the normal channel 16, while waves corresponding to atrial depolarization are coupled via lead 22 to the normal channel 16. The waves corresponding to ventricular depolarization are preferably derived from a lead II connection. Because waves corresponding to atrial depolarization are very often obscure in lead II waves, a separate atrial lead is preferably utilized to derive the atrial waves supplied at lead 22 of the input. These atrial waves may be obtained by numerous methods, such as, for example, securing an electrogram probe directly to the atrium, inserting an intracardiac electrode percutaneously or positioning of an esophageal lead.

The total channel 14 operates on the thesis that one complete electrical cycle of the heart is usually indicated by the occurrence of that portion of the lead II wave commonly associated with depolarization of the ventricles. This, of course, corresponds to QRS-complex thereof. Thus, the total channel 14 includes an electrical circuit coupled to the electrocardiogram input for supplying an indicator-actuating output upon the occurrence of waves having amplitude and rise time typical of ventricular depolarization. As illustratively embodied, this occurrence is recognized by the presence of R-waves having predetermined characteristics. The operation particulars of this circuit are diagrammatically shown in FIG. 3.

As shown in FIG. 3, electrocardiogram lead II waves, preferably taken from the monitor jack of an electrocardiogram writer, are amplified in amplifier 24 to bring the input waves to a suitable operating level, such as, for example, to a level having a 10-volt normal R-wave. The thus amplified waves are then coupled via lead 20 to a fixed amplitude level adjust 26. Thereafter, the input waves are differentiated and full-wave rectified in differentiator 28 and full-wave rectifier 30, respectively. The differentiation of the input waves tends to deemphasize portions having rise time characteristically subchannels than the typical QRS-complex. This differentiation of input waves, together with a limitation on the counting rate more fully discussed below, is also helpful in eliminating double counts erroneously produced from a single electrical cycle and which usually occur when excessive T-wave amplitudes are present. The selection of an optimum time constant for differentiator 28 has not been found particularly critical, and a time constant anywhere in the range of 5 to 10 milliseconds has been found quite satisfactory. The resultant output of the full-wave rectifier 30 is thereafter coupled to an amplitude level detector 32. The level detector 32 supplies an actuating output to a pulse-shaping generator 34 whenever the output of the full-wave rectifier 30 exceeds a fixed predetermined amplitude level chosen as indicating the occurrence of ventricular depolarization. Successful results have been made by setting the level of the level detector 32 at a level corresponding to three tenths of the amplitude of a normal R-wave.

The pulse-shaping generator 34 performs two functions. First, the generator 34 actuates a total counter 36 forming part of the indicator 18 shown in FIG. 2, and second, it affords a means for limiting the maximum count rate of the indicator to prevent passage of double counts erroneously produced from a single cardiac electrical cycle. While the maximum rate of the pulse generator 34 could be a variable parameter, it has been found that a choice of two fixed maximum rates is quite satisfactory. Thus, under condition wherein normal heart rates are of 120 beats per minute or less, a maximum counting rate of 200 per minute proves most satisfactory, and for forms of life having a higher intrinsic electrical rate, a maximum rate of 300 per minute is most successful.

As shown in FIG. 3, the output of the pulse-shaping generator 34 also includes an output lead 38 for coupling same to a digital printer or the like in order to print out the total number of complexes along with a time reference derived in any well-known manner, thus providing at a glance an indication of the presence of ventricular arrhythmias.

The normal channel 16 operates on the premise that since most ventricular arrhythmias are characterized by asynchronous ventricular depolarization, i.e., premature QRS-complexes and thus premature R-waves, normal complexes are indicated by a proper sequence at a normal or predetermined interval of waves corresponding to atrial and ventricular depolarization. As embodied, the occurrence of this proper sequence is determined by ascertaining in the normal channel 16 whether or not the complexes of the input waves have a normal or predetermined P-R interval. Accordingly, the normal channel 16 includes circuit means coupled to the input 12 for supplying an indicator-actuating output upon the occurrence of R-waves within a normal or predetermined interval after the occurrences of P-waves. The particulars of the operation of such circuit are shown schematically in FIG. 4.

As shown in FIG. 4, the normal channel 16 includes an atrial subchannel shown generally at 38 and a ventricular subchannel shown generally at 40. The atrial subchannel 38 analyzes the waves supplied thereto via lead 22 from the input 12 (FIG. 2) and determines the occurrence of P-waves (i.e. the occurrence of atrial depolarization). The ventricular subchannel 40 analyzes waves shown schematically by waveform 43 in FIG. 5A and supplied by input 12 (FIG. 2) via lead 20, and determines therefrom the occurrence of R-waves (i.e. the occurrence of ventricular depolarization). The atrial and ventricular subshannels 38, 40 outputs are coupled to a Q-R gate 42 which determines from these outputs whether ventricular depolarization occurs within a normal or predetermined period after atrial depolarization, and thus, whether a normal complex is present.

The atrial subchannel 38 includes amplifier 41 and 44 which amplify the atrial signal input, and which couple the input signal to an amplitude level detector 46, the latter being adapted to detect the occurrence of waves having amplitude and rise time typical of P-waves. As illustratively embodied, the occurrence of P-waves is determined by the presence at the input of waves having a predetermined amplitude and rise time. Such waves are shown generally at 48 in FIG. 5B. The output of the level detector 46 is utilized to actuate a variable delay trigger 50 having a delay interval related to normal or a predetermined interval between atrial and ventricular depolarization and, specifically, to normal or a predetermined P-R interval. This delay interval is represented schematically in FIG. 5C by the time duration of pulse 52. At the termination of the delay interval, the delay trigger 50 actuates a variable-width gate drive 54 to open the Q-R-gate 42 for a time related to the Q-R-interval. The output and operating interval of the variable width gate drive 54 is shown schematically by the wave 55 in FIG. 5D. The operating interval of gate drive 54 is preferably made variable to accommodate differences in statistical variations during normal depolarizations.

Meanwhile, the waves corresponding to ventricular depolarization (FIG. 5A), and particularly R-waves, are supplied from the input 12 (FIG. 2) through lead 20 and a level adjust 51 to an amplitude level detector 56 which detects the occurrence of waves having amplitudes typical of ventricular depolarization. Like the operation of the total channel 14 described above, the occurrence of ventricular depolarization in the preferred form of the invention is evidenced by the presence in level detector 56 of R-waves having a predetermined amplitude. The preferred output of the level detector 56 is schematically shown by wave 57 in FIG. 5E. This output is coupled to a differentiator 58 whose preferred output is schematically shown in FIG. 5F by spike 60. Thereafter, the output of differentiator 58 is coupled to the input of the Q-R gate 42 which couples the atrial and ventricular subchannels.

Since the output of the atrial level detector 46 is delayed by the delay trigger 50 for a period related to the normal subsequent occurrence of R-waves of the QRS-complex, the occurrence of spike 60 during the Q-R interval defined by the variable width gate drive 54 indicates that the cycle of the input waves is normal, that is to say, that it has a normal P-R interval.

It has been determined that occasionally atypical complexes are statistically related in time to atrial depolarization and thus to P-waves and that these atypical complexes are erroneously passed through the Q-R gate 42 to actuate the indicator 18. Typically these occasional instances occur where excessive biphasic of T-wave components are found in the input waves. Accordingly, a reject circuit, shown generally at 62, is provided in the normal circuit 16 for rejecting the output of the Q-R gate 42 when such atypical cycles occur. Referring still to FIG. 4, it will be seen that to this end, reject circuit 62 includes a T-wave rejection circuit 64 and a biphasic wave rejection circuit 66, each coupled by a rejection gate 68 between the input 12 (FIG. 2) via lead 20 and the indicator 18.

The T-wave rejection circuit 64 includes a T-wave rejection level adjust 70 which determines the triggering level at which the circuit operates, and a T-wave level detector 72 which provides a gate-actuating signal in response to waves at lead 20 which have excessive positive amplitude levels as determined by the level adjust 70. As shown in FIG. 6, the operating level of the adjust 70 is preferably variable anywhere between 30 and 90 percent of the normal amplitude of the R-wave and the output of the level detector 72 is arranged so as to close the rejection gate 68 whenever excessive T-amplitudes above the level of adjust 70 are present. Since excessive T-waves are generally evident in an interval after the occurrence of the QRS-complex and thus after the occurrence of the R-wave thereof, a variable delay trigger 74 is provided to couple the output of the Q-R gate 42 to the rejection gate 68 and to delay its passage to the rejection gate 68 until such time as a T-wave at the lead 20 is normally detected by the T-wave rejection circuit 64. In many instances, this delay interval may be tens of milliseconds. It has been found that best results are obtained when not only the rejection level of the T-wave reject circuit is a variable as discussed above, but also when the delay time of the variable delay trigger 74 is variable. As schematically shown in FIG. 6, the variable delay interval may correspond anywhere between 50—125 milliseconds after the onset of normal T-waves. To this end, a T-wave rejection time adjust 76 is coupled to the delay trigger 74 to vary the delay interval of the delay trigger 74.

In order to reject waves, and specifically R-waves, having an excessive biphasic component, the biphasic rejection circuit 66 includes a biphasic rejection level adjust 78 which functions similar to the T-wave rejection level adjust 70 discussed above, in that as diagrammatically shown in FIG. 6, the biphasic adjust 78 determines the rejection level at which the biphasic circuit 66 operates. The output of the biphasic rejection level adjust 78 is coupled to a negative polarity amplitude level detector 80 which activates a fixed duration gate drive generator 82 upon the occurrence of input waves having predetermined negative excessive biphasic components. The gate drive generator 82 is utilized, in part, to make the operation of the biphasic rejection circuit 66 time compatible with the operation of the T-wave rejection circuit 64. Specifically, since the delay trigger 74 introduces a delay in the output of the Q-R gate 42, the fixed duration gate drive generator 82 turns off the rejection gate 68 for a duration longer than maximum delay interval of the variable delay trigger 74, thus eliminating the output of the Q-R gate 42 when excessive biphasic components exist.

Thus, when an input wave having excessive biphasic or T-wave amplitude levels is passed by the Q-R gate 42, the reject circuit 62, through the operation of the rejection gate 68, rejects the output of the Q-R gate 42, thereby preventing its count in the indicator 18.

The output of the rejection gate 68 is preferably connected to a normal counter 84 forming a part of the indicator 18 as well as to a printer (not shown) via lead 86 for the same reason and in the same manner as that done in the total channel 14 and discussed above.

Description of Detailed Circuits

While many circuit embodiments can be used to realize the monitoring apparatus discussed above, the circuits shown schematically in FIGS. 7A—D provide satisfactory operation.

Figure 7A:
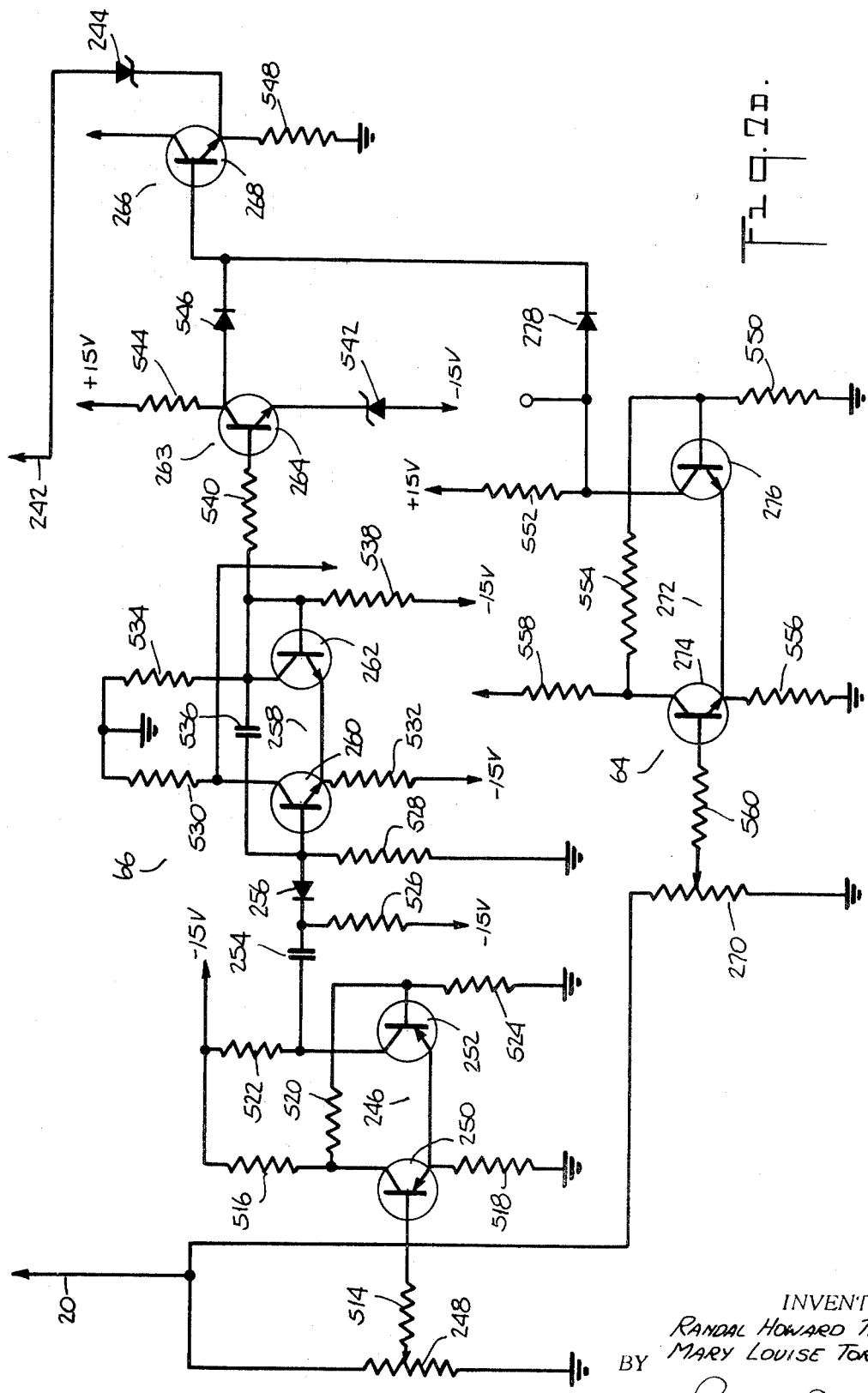

Reference is first made to FIG. 7A which shows in schematic form a specific circuit corresponding to the total channel 14 discussed above and shown diagrammatically in FIG. 3. As shown in FIG. 7A, lead II waves preferably derived from a monitor jack of an electrocardiogram writer, are coupled through an operational amplifier 24 having gain regulating circuitry shown generally at 88, to an amplifier, shown generally at 90 comprising a transistor 92. The output of the amplifier 90 is taken from a tapped resistor 94 connected in the emitter circuit of the transistor 92. The tapped resistor functions to adjust the level of the input wave similar to the level adjust 26 discussed above in connection with FIG. 3. The output of the tapped resistor 94 is coupled to a differentiating circuit, shown generally at 96, which comprises capacitor 98, resistor 100 and inductor 102 forming the primary winding of transformer 104. The differentiating circuit 96 corresponds to the differentiator 28 of FIG. 3. After passing through the differentiator 96, the thus differentiated input wave is coupled to a full-wave rectifier, shown generally at 106, and comprising diodes 108 and 110. The rectifier 106 corresponds to rectifier 30 of FIG. 3. The output of the rectifier 106 is then passed through a two stage DC amplifier, shown generally at 112, and defined, in part, by transistors 114 and 116. The output of the amplifier 112 is taken from the collector of transistor 116 and is coupled through resistor 118 to a Schmitt trigger circuit shown generally at 120. The Schmitt trigger circuit comprises transistors 122 and 124 which are biased such that transistor 124 is normally on, and thus by reason of the base-to-collector connection, transistor 122 is normally cut off. When the input to the Schmitt trigger circuit 120 reaches a predetermined positive level the transistor 122 is made conductive, thus driving the base of transistor 124 negative and cutting the transistor 124 off in a well-known manner. The output pulse of the Schmitt trigger circuit 120, taken at the collector of transistor 124 and thus being a positive-going pulse, is coupled through a differentiating capacitor 126 and a positive trigger diode 128 to a monostable pulse generator shown generally at 130.

The monostable pulse generator 130 includes a multivibrator 132 defined, in part, by transistors 134 and 136, and a switching circuit 138 having a unijunction transistor 140. It will be noted that while the multivibrator 130 has cross coupling between the bases and collectors of the transistors 134, 136 and thus is inherently bistable, the operation of the switching circuit 138, when connected in the manner shown in FIG. 7A, effectively changes the operation of multivibrator 132 to a monostable multivibrator. Specifically, the switching circuit 138, comprising, in part, a normally conducting unijunction transistor 140, a capacitor 142, and a resistor 340, normally provides an impedance path across the emitter-collector of transistor 134 which maintains transistor 134 off and thus transistor 136 on. Upon application of a positive going pulse to the base of transistor 136 from Schmitt trigger circuit 120, the transistor 136 is turned off and the transistor 134 is turned on. This change of state turns off unijunction transistor 140 and thus connects capacitor 142 into the collector-emitter circuit of transistor 134. This change makes the multivibrator 132 quasi stable since capacitor 142 will proceed to discharge to a value allowing conduction of unijunction transistor 140 and thus reverting multivibrator 132 back to its original or stable state.

The purpose of this particular multivibrator configuration is to accurately limit the operating rate of the total cardiac channel 14. The output pulse width of monostable pulse generator 130 is determined solely by the RC combination represented by capacitor 142 and resistor 340. Accordingly, additional input triggers to the monostable pulse generator 130, which are sometimes produced by ectopic cardiac complex have no effect on the monostable output duration, once it has been initiated.

The output of pulse generator 130 is taken from the collector of transistor 136 and is coupled through a differentiating capacitor 144 and a negative trigger diode 146 to actuate another monostable multivibrator shown generally at 148. The monostable multivibrator 148 comprises transistors 150 and 152 which are arranged such that in the stable state, transistor 150 is on and thus maintains transistor 152 off. Upon application of a negative pulse from the monostable multivibrator 130, the transistor 150 is turned off, thus turning on transistor 152 and providing an indicator-triggering pulse at the collector of transistor 152. The collector of transistor 152 is coupled through a current-limiting resistor 153 to a counting coil 154 which is magnetically coupled to a mechanical counter, such as counter 36 shown in FIG. 3. Thus, monostable multivibrators 130 and 148 correspond to the pulse-shaping generator 34 of FIG. 3.

It will be seen from the above that whenever the differentiating circuit 96 and the level detector 120 determine that input waves have rise time and amplitude characteristics typical of normal R-waves, a pulse is produced across the counting coil 154 to indicate the occurrence of one complete electrical cardiac cycle.

The specific circuitry for realizing the normal channel 16 shown diagrammatically in FIG. 4, is schematically illustrated in FIGS. 7B, C, and D, when the sheets bearing these figures are turned on their side and viewed in alphabetical order.

Thus, referring first to FIG. 7B, it will be seen that the atrial subchannel, is connected to the input 12 (FIG. 2) via the lead 22 and is coupled through an amplifier, shown generally at 156 and defined, in part, by a transistor 158, to a Schmitt trigger circuit shown generally at 160. The Schmitt trigger circuit 160 corresponds to the level detector 46 of FIG. 4 and comprises transistors 162 and 164, the base of the former being connected to the collector of transistor 158 defining amplifier 156. Transistor 164 is biased to be normally on or conductive, and to maintain transistor 162 biased off. The application of a negative-going pulse having a value above the triggering level of the trigger circuit 160 turns transistor 162 on and transistor 164 off. The output of the Schmitt trigger circuit 160 is taken from the collector of transistor 164 and is coupled through a differentiating capacitor 166 to a negative trigger diode 168 via lead 170 and from there, is coupled to a monostable multivibrator shown generally at 172. The monostable multivibrator 172 functions as the variable delay trigger 50 described in connection with FIG. 4 and comprises transistors 174 and 176. Transistors 174 and 176 are arranged such that the transistor 174 is normally on or in its saturated condition, and thus by reason of the collector to base connection therebetween, transistor 176 is normally off or in its nonconductive state.

The output of the monostable multivibrator 172 is taken at the collector of transistor 174, and thus is a positive going output of the form shown by waveform 52 in FIG. 5C. This output is coupled through a differentiating capacitor 178 and a trigger diode 180 to a second monostable multivibrator shown generally at 182. It will be noted that the trigger diode 180 is arranged such as that only the trailing edge of the output pulse from monostable multivibrator 172 triggers the monostable multivibrator 182. This action, of course, causes a delay between the operations of the multivibrators 172 and 182, and thus permits the monostable multivibrator 172 to operate as the variable delay trigger 50 of FIG. 4.

The monostable multivibrator 182 operates as the variable-width gate drive 54 shown in FIG. 4, and includes two transistors 184 and 186, respectively. As shown by their biasing arrangement in FIG. 7B, transistor 184 is maintained on or conductive in the stable state of the multivibrator and transistor 186 is normally off or nonconductive in the stable state. The application of the negative-going pulse from delay multivibrator 172 to the base of transistor 184 turns the latter off thereby driving the monostable multivibrator 182 into its quasi state. The operating interval of the quasi state of the multivibrator 182 is made adjustable by the inclusion of a variably tapped resistor 188 in the cross coupling circuit of the multivibrator. The output of the multivibrator 182 is taken at the collector of transistor 184, and thus is a positive-going pulse of the waveform shown at 55 in FIG. 5D. This output is then coupled through a Zener diode 192 and lead 194 to a gate 196 (FIG. 7C) which comprises transistor 198 and which functions as the Q-R gate 42 discussed in connection with FIG. 4.

Referring now to the top of FIG. 7C, the specific circuitry of the ventricular subchannel 40 is shown in greater detail. Waves typical of ventricular depolarization (i.e. R-waves) are supplied by the input 12 (FIG. 2) via lead 20 to the input of a Schmitt trigger circuit shown generally at 200 and comprising transistors 202 and 204. Schmitt trigger circuit 200 corresponds to the level detector 56 of FIG. 4, and its associated parameters which determine its triggering level correspond to the level adjust 51 of FIG. 4. The transistor 202 of Schmitt trigger 200 is arranged to be normally biased off and transistor 204 is arranged to be normally biased on. Upon the application of a wave from the input 12, sufficient to actuate the Schmitt trigger circuit 200, transistor 202 is made conductive thereby turning off transistor 204 and driving the collector of the latter positive. The output of Schmitt trigger circuit 200, having a waveform as shown at 57 in FIG. 5E, is taken at this mentioned collector and is coupled through a level converter, shown generally at 206 and defined, in part, by transistor 208, to a buffer amplifier shown generally at 210 and defined, in part, by transistor 212. The output of buffer amplifier 210 is taken at the emitter of transistor 212 and is coupled through a differentiating circuit comprising resistor 214 and capacitor 216 to the collector of transistor 198 defining the gate circuit 196 discussed above. The differentiating circuit comprising resistor 214 and capacitor 216 corresponds to the differentiator 58 of FIG. 4 and provides a spike output as shown at 60 in FIG. 5F.

The transistor 198 defining gate circuit 196 is arranged such that it is normally maintained in its saturated condition, thus presenting a very low impedance between its collector and ground. Thus, it will be appreciated that any input signal applied from buffer amplifier 210 across the collector of the transistor 198 will be effectively short circuited to ground and not passed through the gate 196. Upon application of a suitable positive-going pulse via lead 194 from gate drive multivibrator 182, transistor 198 is turned off thereby effectively providing a conductive passageway from buffer amplifier 210 through the gate 196. Thus, it will be appreciated that whenever simultaneously a pulse indicating the occurrence of ventricular depolarization appears at the collector of transistor 198, and a positive pulse indicating the proper or predetermined interval has occurred after atrial depolarization is applied to the base of transistor 198, the pulse at the collector is passed by the gate 196 thus indicating that the wave at input 12 is probably normal.

The output of gate 196 is coupled through a differentiating capacitor 218, a buffer amplifier 220, defined, in part, by transistor 222 and a capacitor 479, to a monostable multivibrator shown generally at 224. The monostable multivibrator 224 functions as the variable delay trigger 74 discussed above in connection with FIG. 4 and comprises transistors 226 and 228, respectively. As shown in FIG. 7C, the transistor 226 is suitably biased so that it is normally maintained on or in a conductive condition during the stable state of the multivibrator 224, and transistor 228 is normally maintained off or nonconductive. A tapped resistor 230 is provided in the cross coupling circuit of the multivibrator 224 for varying its operating or quasi state interval of the multivibrator and functions as the T-wave rejection time adjust 76 of FIG. 4. The application of a negative going pulse from buffer amplifier 220 turns off transistor 226 thereby placing monostable multivibrator 224 into its quasi state, and producing a positive going pulse across the collector of transistor 226, the output of multivibrator 224. The positive going pulse at the collector of transistor 226 is coupled through a differentiating capacitor 231 and a suitable coupling resistor 232 to a reject node 234 defined as the junction of resistor 232 and a trigger diode 236. The trigger diode 236 is in turn coupled to a monostable multivibrator, shown generally at 238, which forms a part of the counter 84 in the indicator 18 (FIG. 2). As shown in FIG. 7C, the trigger diode 236 is arranged such that the monostable multivibrator 238 is triggered by the trailing edge of the positive-going pulse of monostable multivibrator 224, and thus at a predetermined interval or delay after the initiation of the operation of monostable multivibrator 224. This delay, of course, corresponds to the delay interval of the variable delay trigger 74 of FIG. 4.

It will be noted that monostable multivibrator 238 is constructed and arranged substantially the same as monostable multivibrator 148 of total channel 14, and is similarly used to drive a mechanical counter or the like (not shown) magnetically coupled to a counting coil 240 provided in its output.

Reject node 234 is connected through a lead 242 and a Zener diode 244 (FIG. 7D) to portions of the T-wave and biphasic wave rejection circuits 64 and 66, respectively, shown in FIG. 7D, and functions as the rejection gate 68 of FIG. 4 to eliminate pulses translated across the node point 234 when excessive biphasic and/or T-wave complexes occur at the input 12 (FIG. 2). The specifics of the biphasic and T-wave rejection circuits are shown in FIG. 7D.

Considering first the biphasic circuit 66, it will be seen that circuit 66 includes a Schmitt trigger circuit, shown generally at 246, which is connected across tapped resistor 248 and to input 12 (FIG 2) via lead 20. The Schmitt trigger circuit 246 comprises transistors 250 and 252 which are arranged such that transistor 250 is normally maintained in its offer nonconducting state, and transistor 252 is maintained on or in the conductive state. It will be appreciated from the arrangement of tapped resistor 248 that the Schmitt trigger 246 is triggered by input waves exceeding a predetermined negative amplitude and, thus, corresponds to the negative polarity level detector 80 of FIG. 4. The tapped resistor 248 corresponds to the biphasic level adjust 78 of FIG. 4. When waves at lead 20 have an excessive biphasic component, as determined by the tapped resistor 248, Schmitt trigger circuit 246 is actuated such that transistor 250 is turned on and made conductive, and transistor 252 is turned off, thus driving the collector of transistor 252 negative. The output of Schmitt trigger circuit 246 is taken at the collector of transistor 252 and is applied through a differentiating capacitor 254 and a trigger diode 256 to a monostable multivibrator shown generally at 258. Monostable multivibrator 258 includes transistors 260 and 262, the former being biased off and the latter being biased on during the stable state of the multivibrator. The operation or quasi state interval of the monostable multivibrator 258 is arranged such that it is greater than the maximum delay interval of the monostable multivibrator 224 discussed above. The output of monostable multivibrator 258 is taken from the collector of transistor 262 and is coupled through a level converter, shown generally at 263 and defined, in part, by a transistor 164. The monostable multivibrator 258 and level converter 263 correspond to the fixed duration gate drive generator 82 of FIG. 4. A buffer amplifier, shown generally at 266 and comprising transistor 268, couples the output of the level converter 263 to lead 242 (FIG. 7C) via a Zener diode 244.

Thus, it will be appreciated that whenever the input 12 supplies waves having excessive biphasic level, the Schmitt trigger circuit 246 actuates monostable multivibrator 258 to produce a negative-going blocking pulse which is inverted by the level converter 263 and applied as a positive-going pulse to the reject node 234 (FIG. 7C). The application of this positive pulse at this node prevents the passage of the negative triggering pulse from monostable multivibrator 224, and thus prevents the normal channel circuitry from actuating the monostable multivibrator 238 to indicate the existence of a normal input wave.

Turning next to the T-wave rejection circuit 64, waves corresponding to at least ventricular depolarization (i.e. R-waves) are coupled via lead 20 to a tapped resistor 270. The resistor 270 determines the rejection level of T-wave circuit 64 and thus corresponds to the T-wave rejection level adjust 70 of FIG. 4. The tapped output of resistor 270 is then coupled to a Schmitt trigger circuit, shown generally at 272 and comprising transistors 274 and 276. Transistor 274 is arranged such that it is normally maintained off or in the nonconducting condition, and transistor 276 is arranged to be normally on or conductive. Whenever a T-wave applied to lead 20 exceeds a predetermined positive amplitude level, transistor 274 is made conductive and transistor 276 nonconductive. This change of state drives the collector of transistor 276 positive. The output of the monostable Schmitt trigger 272 is taken at the collector of transistor 276 and is coupled through a trigger diode 278 to the buffer amplifier 266. The buffer amplifier 266 cooperates with the Schmitt trigger 272 in substantially the same manner as it does with the monostable multivibrator 258 to maintain the reject node 234 at a voltage level sufficient to prevent passage of triggering pulses from monostable multivibrator 224 to the indicator 18 (FIG. 2).

A summing circuit shown generally at 280 in FIG. 7B and forming part of the output load of amplifier 206 (FIG. 7C), is provided to facilitate adjustment of the variable width gate drive monostable multivibrator 182 and the gate delay interval provided by monostable multivibrator 172. To this end, the outputs of each are respectively coupled via lead 282 to the summing circuit where they are summed or superimposed with the output of Schmitt trigger 200 present in the output load of amplifier 206. A lead 284 (FIG. 7B and 7C) is also provided so that the resultant composite pattern may be conveniently displayed on an oscilloscope or the like. In addition, an output may also be provided at the output of the Schmitt trigger circuit 160 to provide a trigger signal for the oscilloscope.

While many component values may be utilized in the realization of the circuits shown schematically in FIGS. 7A—D, the following values have provided satisfactory results:

RESISTORS

| Element: | Ohms |
|---|---|
| 302 | 100K |
| 304 | 100K |
| 306 | 4.7M |
| 310 | 1K |
| 94 | 10K |
| 312 | 1K |
| 100 | 56K |
| 314 | 33K |
| 316 | 22K |
| 318 | 100 |
| 320 | 560 |
| 118 | 4.7K |
| 322 | 4.7K |
| 324 | 680 |
| 326 | 10K |
| 330 | 3.3K |
| 332 | 15K |
| 334 | 22K |
| 336 | 22K |
| 338 | 470 |
| 340 | 150K |
| 342 | 820K |
| 344 | 5.6K |
| 346 | 270 |
| 348 | 1K |
| 352 | 15K |
| 356 | 15K |
| 358 | 47K |
| 360 | 47K |
| 362 | 1K |
| 364 | 33K |
| 366 | 47K |
| 368 | 15K |
| 372 | 2.7K |
| 378 | 22 |
| 382 | 68K |
| 384 | 1K |
| 386 | 15K |
| 388 | 5.6K |
| 390 | 680 |
| 392 | 6.8K |
| 394 | 5.6K |
| 396 | 10K |
| 398 | 15K |
| 400 | 22K |
| 402 | 22K |
| 404 | 22K |
| 406 | 18K |
| 408 | 33K |
| 410 | 68K |
| 414 | 56K |
| 416 | 680 |
| 418 | 3.9K |
| 420 | 10K |
| 422 | 3.9K |
| 424 | 22K |
| 426 | 2.7K |
| 430 | 18K |
| 432 | 33K |
| 188 | 25K |
| 434 | 100K |
| 438 | 2.7K |
| 444 | 3.3K |
| 446 | 3.3K |
| 448 | 10K |
| 442 | 680 |
| 450 | 5.6K |
| 452 | 6.8K |
| 454 | 4.7K |
| 456 | 10K |
| 458 | 680 |
| 460 | 4.7K |
| 462 | 15K |
| 464 | 15K |
| 466 | 10K |
| 468 | 3.3K |
| 214 | 5.6K |
| 470 | 22K |
| 472 | 15K |
| 474 | 22K |
| 475 | 220 |
| 476 | 33K |
| 478 | 15K |
| 230 | 25K |
| 480 | 22K |
| 482 | 680 |
| 486 | 3.3K |
| 488 | 3.3K |
| 490 | 10K |
| 492 | 5.6K |
| 494 | 22K |
| 232 | 3.9K |
| 496 | 33K |
| 498 | 47K |
| 500 | 2.7K |
| 502 | 15K |
| 508 | 47 |
| 510 | 6.8K |
| 248 | 10K |
| 514 | 5.6K |
| 516 | 5.6K |
| 518 | 680 |
| 520 | 10K |
| 522 | 4.7K |
| 524 | 15K |
| 526 | 33K |
| 528 | 39K |
| 530 | 3.3K |
| 532 | 680 |
| 534 | 3.3K |
| 538 | 15K |
| 540 | 10K |
| 544 | 5.6K |
| 548 | 10K |
| 270 | 10K |
| 560 | 5.6K |
| 556 | 680 |
| 558 | 5.6K |
| 552 | 4.7K |
| 550 | 15K |

CAPACITORS

| Element: | Farads |
|---|---|
| 300 | 3 µf. |
| 308 | 390 pf. |
| 98 | 1 µf. |
| 328 | .001 µf. |
| 126 | .025 µf. |
| 142 | 2 µf. |
| 350 | .01 µf. |
| 354 | .01 µf. |
| 144 | .025µf. |
| 370 | 1 µf. |
| 380 | .025 µf. |
| 166 | .025 µf. |
| 428 | 4 µf. |
| 178 | .025 µf. |
| 440 | 2.2 µf. |
| 216 | .025 µf. |
| 218 | .025 µf. |
| 479 | .025 µf. |
| 484 | 3.3 µf. |
| 231 | .025 µf. |
| 238 | 2 µf. |
| 254 | .025 µf. |
| 536 | 5 µf. |
| 411 | .025 µf. |

TRANSISTORS

| Element: | Identification |
|---|---|
| 92 | 2 N338 |
| 114 | 2 N1304 |
| 116 | 2 N1305 |
| 122 | 2 N1304 |
| 124 | 2 N1304 |
| 140 | 2 N492 |
| 134 | 2 N1305 |
| 136 | 2 N1305 |
| 150 | 2 N1304 |
| 152 | 2 N1304 |
| 158 | 2 N1304 |
| 162 | 2 N1305 |
| 164 | 2 N1305 |
| 176 | 2 N1304 |
| 174 | 2 N1304 |
| 184 | 2 N1304 |
| 186 | 2 N1304 |
| 202 | 2 N104 |
| 204 | 2 N104 |
| 208 | 2 N388 |
| 212 | 2 N1305 |
| 198 | 2 N1305 |
| 222 | 2 N1305 |
| 226 | 2 N1304 |
| 228 | 2 N1304 |
| 504 | 2 N1304 |
| 506 | 2 N1304 |
| 550 | 2 N1305 |
| 552 | 2 N1305 |
| 260 | 2 N1304 |
| 562 | 2 N1304 |
| 264 | 2 N1304 |
| 268 | 2 N1304 |
| 274 | 2 N1304 |
| 276 | 2 N1304 |

DIODES

| Element: | Identification |
|---|---|
| 108 | 1 N456 |
| 110 | 1 N456 |
| 128 | 1 N456 |
| 146 | 1 N456 |
| 374 | 1 N2070 |
| 376 | 1 N2070 |
| 168 | 1 N456 |
| 412 | 1 N456 |
| 180 | 1 N456 |
| 236 | 1 N456 |
| 512 | 1 N2070 |
| 256 | 1 N456 |
| 542 | 1 N712 |
| 546 | 1 N456 |
| 244 | 1 N710 |
| 278 | 1 N456 |

EMBODIMENT OF FIGS. 8 AND 9

Because in the embodiment of FIGS. 2—7, the atrial signal is applied by lead 22, a separate lead from lead 20, a modified form of the invention has been obtained wherein only a single input signal is necessary. This alternate embodiment is diagrammatically shown in FIG. 8. The signal utilized in this embodiment corresponds to the normal lead II signal found at lead 20 in the embodiment of FIGS. 2—7. This embodiment corresponds essentially to that described above in connection with FIGS. 2—7 except in the particulars of the normal channel. Thus the total channel 14 and indicator 18 of the embodiment of FIGS. 2—7 may be used in conjunction with this alternate embodiment to produce a monitoring apparatus constructed in accordance with the present invention.

Referring to FIG. 8, there is shown a normal channel 16' which operates on the premise that a typical R-wave width measured at some predetermined height above the baseline, is apt to identify normal wave patterns, thus eliminating the need for a separate atrial signal. To this end, as shown in FIG. 8, input 12 is connected via lead 20 to both a ventricular and "atrial" subchannels 40' and 38', respectively, which except as discussed below, are constructed and operate similar to the atrial and ventricular subchannels discussed above in connection with the embodiment of FIGS. 2—7. In the present embodiment, the "atrial" subchannel 38' determines the onset of waves typical of ventricular depolarization which have a predetermined amplitude, and the ventricular subchannel 40' determines the time when waves typical of ventricular depolarization should fall to a corresponding or different predetermined value. The output of the "atrial" subchannel is utilized to control a R-S gate 290 which translates the output of the ventricular subchannel 40' to indicator 18 (not shown) whenever the output occurs within a predetermined interval after the onset of ventricular depolarization. In the present embodiment, the ventricular subchannel 40' includes (like that in the embodiment of FIGS. 2—7) a level adjust 51' and an amplitude level detector 56' which provides an indicating output whenever the input waves reach a predetermined level typical of ventricular depolarization, for example one third normal R-wave level, and also includes a differentiator 58' which differentiates the output of the level detector 56'. Similarly, the "atrial" subchannel 38' includes a variable gain control amplifier 44' coupled to the input (not shown) via lead 20 which amplifies the input waves to provide a quality signal to an amplitude level detector 46'. The level detector 46' provides an output in response to input waves whenever said input waves have amplitudes beyond a predetermined level. It has been found that adequate results are obtained if this predetermined level is set at approximately one third normal R-wave amplitude. The output from the level detector 46' is then coupled to a variable delay trigger 50' which provides a delayed output triggering pulse to a variable-width gate drive 54'. As schematically shown by the waveform 292 in FIG. 9, the delay imparted by the variable delay trigger 50' is chosen such that the variable-width gate drive 54' will actuate the R-S gate 290 at a time corresponding to recovery of a normal R-wave measured to the same height at which the level detector 46' is referenced. Thus, any outputs from the R-S gate 290 are generally indicative of the occurrence of input waves having normal QRS-complexes.

The remainder portion of the normal channel shown in FIG. 8 operates similar to the corresponding portion of the normal circuit shown in FIG. 4 of the embodiment described above, to reject from the output of the R-S gate 290 those complexes which have excessive biphasic and T-wave components. Thus, the input waves are fed both through the T-wave rejection circuit 64 and the biphasic rejection circuit 66 in substantially the same manner as described above in connection with FIGS. 2—7, to operate the rejection gate 68 and eliminate from the pulses passes through the R-S gate 290 those which were made by atypical wave complexes having characteristics which by statistical coincidence are properly related to the normal interval between the onset and fall of a normal R-wave measured at a reference amplitude.

It will be evident from the above that the specific circuitry used to carry out the embodiment schematically shown in FIG. 8 and 9 may be the same as that described in connection with the embodiment of FIGS. 2—7, except for the major changes of connecting the lead 20 to the "atrial" channel 38' in lieu of the lead 22, shortening the delay interval of the delay trigger 50' to correspond to the measured width of the R-wave as described above, and modifying the input to the R-S gate 290 from the ventricular channel 40 so that its actuating pulse occurs during the recovery of R-waves.

Thus, it will be appreciated from the above that there is provided in accordance with the present invention, a simple and relatively inexpensive arrhythmia monitoring apparatus and related method which are capable of on-line operation and which have operational simplicity and reliability not demanding highly skilled operators.

What we claim and desire to secure by Letters Patent is:

1. In an apparatus for use in determining the presence of cardiac arrhythmias in higher forms of life, the combination of:

a. input means for supplying waves corresponding to the electrical phases of cardiac activity, including the P-wave, the QRS-complex and the T-wave of each cycle of normal cardiac activity;

b. a first circuit means, connected to said input means, effective to determine whether or not the R wave portion of a cycle is normal, and producing in the output of said first circuit means an electrical pulse for each cardiac cycle when the said R wave portion of that cycle is normal;

c. a second circuit means, connected to said input means, effective to determine whether or not the cardiac wave has an excessive negative component, and producing in the output of said second circuit means an electrical pulse for each cardiac cycle when that cycle contains an excessive negative component;

d. a first counting means effective to indicate the number of times it has had an actuating electrical pulse applied to its input; and e. a third circuit means, connected to the output of the first circuit means, to the output of the second circuit means and to the input of the first counting means, effective to pass the pulses from the output of the first circuit means to the first counting means, and also effective, upon receipt of the pulse from the output of the second circuit means, arising from a determination for a given heart cycle that that heart cycle has an excessive negative component, to block the passage of the pulse from the output of the first circuit means, arising from a determination for the same given heart cycle, to the first counting means.

2. In an apparatus for use in determining the presence of cardiac arrhythmias in higher forms of life, the combination of:

a. input means for supplying waves corresponding to the electrical phases of cardiac activity, including the P-wave, the QRS-complex and the T-wave of each cycle of normal cardiac activity;

b. a first circuit means, connected to said input means, effective to determine whether or not the R-wave portion of a cycle is normal, and producing in the output of said first circuit means an electrical pulse for each cardiac cycle when the said R wave portion of that cycle is normal;

c. a second circuit means, connected to said input means, effective to determine whether or not the T-wave portion of a cycle has excessive amplitude, and producing in the output of said second circuit means an electrical pulse for each cardiac cycle when that cycle contains a T-wave portion having excessive amplitude;

d. a first counting means effective to indicate the number of times it has had an actuating electrical pulse applied to its input; and e. a third circuit means, connected to the output of the first circuit means, to the output of the second circuit means, and to the input of the first counting means, effective to pass the pulses from the output of the first circuit means to the first counting means, and also effective, upon receipt of the pulse from the output of the second circuit means, arising from a determination for a given heart cycle that the T-wave portion of that heart cycle has excessive amplitude, to block the passage of the pulse from the output of the first circuit means, arising from a determination for the same given heart cycle, to the first counting means.

3. In an apparatus for use in determining the presence of cardiac arrhythmias in higher forms of life, the combination of:

a. input means for supplying waves corresponding to the electrical phases of cardiac activity, including the P-wave, the QRS-complex and the T-wave of each cycle of normal cardiac activity;

b. a first circuit means, connected to said input means, effective to determine whether or not the R-wave portion of a cycle is normal, and producing in the output of said first circuit means an electrical pulse for each cardiac cycle when the said R-wave portion of that cycle is normal;

c. a second circuit means, connected to said input means, effective to determine whether or not the cardiac wave has an excessive negative component, and producing in the output of said second circuit means an electrical pulse for each cardiac cycle when that cycle contains an excessive negative component;

d. a third circuit means, connected to said input means, effective to determine whether or not the T-wave portion of a cycle has excessive amplitude, and producing in the output of said third circuit means an electrical pulse for each cardiac cycle when that cycle contains a T-wave portion having excessive amplitude;

e. a first counting means effective to indicate the number of times it has had an actuating electrical pulse applied to its input; and f. a fourth circuit means, connected to the output of the first circuit means, to the output of the second circuit means, to the output of the third circuit means and to the input of the first counting means, effective to pass the pulses from the output of the first circuit means to the first counting means, and also effective, upon receipt of a pulse either (i) from the output of the second circuit means, arising from a determination for a given heart cycle, that that heart cycle has an excessive negative component, or (ii) from the output of the third circuit means, arising from a determination that the T-wave portion of that heart cycle has excessive amplitude, to block the passage of the pulse from the output of the first circuit means, arising from a determination for the same given heart cycle, to the first counting means.

4. In an apparatus for use in determining the presence of cardiac arrhythmias in higher forms of life, the combination of:

a. input means for supplying waves corresponding to the electrical phases of cardiac activity, including the P-wave, the QRS-complex and the T-wave of each cycle of normal cardiac activity;

b. a first circuit means, connected to said input means, effective to determine whether or not the R-wave portion of a cycle is normal, and producing in the output of said first circuit means an electrical pulse for each cardiac cycle when the said R-wave portion of that cycle is normal, said first circuit means including a time delay means delaying the appearance of such electrical pulse in the output of said first circuit means until a time in the cardiac cycle significantly after the completion of the R-wave;

c. a second circuit means, connected to said input means, effective to determine whether or not the cardiac wave has an excessive negative component, and producing in the output of said second circuit means a prolonged electrical pulse for each cardiac cycle when that cycle contains an excessive negative component, with said prolonged electrical pulse terminating in the latter portion of the same cardiac cycle in which it was initiated;

d. a first counting means effective to indicate the number of time it has had an actuating electrical pulse applied to its input; and e. a third circuit means, connected to the output of the first circuit means, to the output of the second circuit means and to the input of the first counting means, effective to pass the pulses from the output of the first circuit means to the first counting means, and also effective, upon receipt of a pulse from the output of the second circuit means, arising from a determination for a given heart cycle that that heart cycle has an excessive negative component, with such receipt of the pulse from the output of the second circuit means being at any time when the output pulse from the first circuit means for that same heart cycle is received, to block the passage of such first circuit means output pulse to the first counting means.

5. In an apparatus for use in determining the presence of cardiac arrhythmias in higher forms of life, the combination of:

a. input means for supplying waves corresponding to the electrical phases of cardiac activity, including the P-wave, the QRS-complex and the T-wave of each cycle of normal cardiac activity;

b. a first circuit means, connected to said input means, effective to determine whether or not the R-wave portion of a cycle is normal, and producing in the output of said first circuit means an electrical pulse for each cardiac cycle when the said R-wave portion of that cycle is normal, said first circuit means including a time delay means delaying the appearance of such electrical pulse in the output of said first circuit means until a time in the cardiac cycle significantly after the completion of the R-wave;

c. a second circuit means, connected to said input means, effective to determine whether or not the T-wave portion of a cycle has excessive amplitude, and producing in the output of said second circuit means an electrical pulse for each cardiac cycle when that cycle contains a T-wave portion having excessive amplitude;

d. a first counting means effective to indicate the number of times it has had an actuating electrical pulse applied to its input; and e. a third circuit means, connected to the output of the first circuit means, to the output of the second circuit means, and to the input of the first counting means, effective to pass the pulses from the output of the first circuit means to the first counting means, and also effective, upon receipt of the pulse from the output of the second circuit means, arising from a determination for a given heart cycle that the T-wave portion of that heart cycle has excessive amplitude, with such receipt of the pulse from the output of the second circuit means being at a time when the output pulse from the first circuit means for that same heart cycle is received, to block the passage of such first circuit means output pulse to the first counting means, whereby the output pulse of the second circuit means arising from the R-wave portion of the cycle is ineffective, as it occurs before the pulse produced by the first circuit means appears in the output thereof and is applied to the third circuit means.

6. In an apparatus for use in determining the presence of cardiac arrhythmias in higher forms of life, the combination of:

a. input means for supplying waves corresponding to the electrical phases of cardiac activity, including the P-wave, the QRS-complex and the T-wave of each cycle of normal cardiac activity;

b. a first circuit means, connected to said input means, effective to determine whether or not the R-wave portion of a cycle is normal, and producing in the output of said first circuit means an electrical pulse for each cardiac cycle when the said R-wave portion of that cycle is normal, said first circuit means including a time delay means delaying the appearance of such electrical pulse in the output of said first circuit means until a time in the cardiac cycle significantly after the completion of the R-wave;

c. a second circuit means, connected to said input means, effective to determine whether or not the cardiac wave has an excessive negative component, and producing in the output of said second circuit means a prolonged electrical pulse for each cardiac cycle when that cycle contains an excessive negative component, with said prolonged electrical pulse terminating in the latter portion of the same cardiac cycle in which it was initiated;

d. a third circuit means, connected to said input means, effective to determine whether or not the T-wave portion of a cycle has excessive amplitude, and producing in the output of said third circuit means an electrical pulse for each cardiac cycle when that cardiac cycle contains a T-wave portion having excessive amplitude;

e. a first counting means effective to indicate the number of times it has had an actuating electrical pulse applied to its input; and f. a fourth circuit means, connected to the output of the first circuit means, to the output of the second circuit means, to the output of the third circuit means and to the input of the first counting means, (i) effective to pass the pulses from the output of the first means to the first counting means, and also (ii) effective, upon receipt of a pulse from the output of the second circuit means, arising from a determination for a given heart cycle that that heart cycle has an excessive negative component, with such receipt of the pulse from the output of the second circuit means being at any time when the output pulse from the first circuit means for that same heart cycle is received, to block the passage of said first circuit means output pulse to the first counting means, and also (iii) effective, upon receipt of a pulse from the output of the third circuit means, arising from a determination that the T-wave portion of that heart cycle has excessive amplitude, with such receipt of the pulse from the output of the third circuit means being at a time when the output pulse from the first circuit means is received, to block the passage of such first circuit means output pulse to the first counting means, whereby the output pulse of the third circuit means arising from the R-wave portion of the cycle is ineffective, as it occurs before the pulse produced by the first circuit means appears in the output thereof and is applied to the fourth circuit means.

7. In an apparatus for use in determining the presence and rate of occurrence of cardiac arrhythmias in higher forms of life, the combination of the elements (a) thru (e) as set forth in claim 1, together with f. a fourth circuit means, connected to said input means, for producing a single electrical pulse in the output thereof for each complete cardiac cycle, said fourth circuit means including:

i. differentiating means for accenting the R-wave portion of each cycle relative to the other wave portions of the cycle;

ii. rectifying, amplifying and trigger circuit means for producing in the output thereof an electrical pulse arising from the R-wave portion of each cycle;

iii. monostable pulse generator means connected to the output of the rectifying, amplifying and trigger circuit means for producing in its output an single electrical pulse having a large pulse width that terminates near the end of the cardiac cycle in which it was initiated, so that any additional input trigger pulse that sometimes is produced by an ectopic cardiac complex in that cardiac cycle has no effect on the single output pulse of the monostable pulse generator means, once that single output pulse is initiated;

iv. a second counting means effective to indicate the number of times it has had an actuating electrical pulse applied to its input; and v. means connecting the output of the monostable pulse generator means to said second counting means, so that the latter means indicates the number of complete cardiac cycles that have occurred, without duplication of count due to any ectopic cardiac complex that may exist in one or more cardiac cycles, whereby the number indicated by the first counting means is the number of normal cardiac cycles, as determined by the combination of elements set forth in claim 1, that have occurred during the period in which occurred the number of complete cardiac cycles indicated by the second counting means.

8. In an apparatus for use, in determining the presence and rate of occurrence of cardiac arrhythmias in higher forms of life, the combination of the elements (a) thru (e) as set forth in claim 2 together with f. a fourth circuit means, connected to said input means, for producing a single electrical pulse in the output thereof for each complete cardiac cycle, said fourth circuit means including:

i. differentiating means for accenting the R wave portion of each cycle relative to the other wave portions of the cycle;

ii. rectifying, amplifying and trigger circuit means for producing in the output thereof an electrical pulse arising from the R-wave portion of each cycle;

iii. monostable pulse generator means connected to the output of the rectifying, amplifying and trigger circuit means for producing in its output a single electrical pulse having a large pulse width that terminates near the end of the cardiac cycle in which it was initiated, so that any additional input trigger pulse that sometimes is produced by an ectopic cardiac complex in that cardiac cycle has no effect on the single output pulse of the monostable pulse generator means, once that single output pulse is initiated;

iv. a second counting means effective to indicate the number of times it has had an actuating electrical pulse applied to its input; and v. means connecting the output of the monostable pulse generator means to said second counting means, so that the latter means indicates the number of complete cardiac cycles that have occurred, without duplication of count due to any ectopic cardiac complex that may exist in one or more cardiac cycles, whereby the number indicated by the first counting means is the number of normal cardiac cycles, as determined by the combination of elements set forth in claim 2, that have occurred during the period in which occurred the number of complete cardiac cycles indicated by the second counting means.

9. In an apparatus for use in determining the presence and rate of occurrence of cardiac arrhythmias in higher forms of life, the combination of the elements (a) thru (f) as set forth in claim 3, together with g. a fifth circuit means, connected to said input means, for producing a single electrical pulse in the output thereof for each complete cardiac cycle, said fifth circuit means including:

i. differentiating means for accenting the R-wave portion of each cycle relative to the other wave portions of the cycle;

ii. rectifying, amplifying and trigger circuit means for producing in the output thereof an electrical pulse arising from the R-wave portion of each cycle;

iii. monostable pulse generator means connected to the output of the rectifying, amplifying and trigger circuit means for producing in its output a single electrical pulse having a large pulse width that terminates near the end of the cardiac cycle in which it was initiated, so that any additional input trigger pulse that sometimes is produced by an ectopic cardiac complex in that cardiac cycle has no effect on the single output pulse of the monostable pulse generator means, once that single output pulse is initiated;

iv. a second counting means effective to indicate the number of times it has had an actuating electrical pulse applied to its input; and v. means connecting the output of the monostable pulse generator means to said second counting means, so that the latter means indicates the number of complete cardiac cycles that have occurred, without duplication of count due to any ectopic cardiac complex that may exist in one or more cardiac cycles, whereby the number indicated by the first counting means is the number of normal cardiac cycles, as determined by the combination of elements set forth in claim 3, that have occurred during the period in which occurred the number of complete cardiac cycles indicated by the second counting means.

10. In an apparatus for use in determining the presence and rate of occurrence of cardiac arrhythmias in higher forms of life, the combination of the elements (a) thru e. as set forth in claim 4, together with f. a fourth circuit means, connected to said input means, for producing a single electrical pulse in the output thereof for each complete cardiac cycle, said fourth circuit means including:

i. differentiating means for accenting the R-wave portion of each cycle relative to the other wave portions of the cycle;

ii. rectifying, amplifying and trigger circuit means for producing in the output thereof an electrical pulse arising from the R-wave portion of each cycle;

iii. monostable pulse generator means connected to the output of the rectifying, amplifying and trigger circuit means for producing in its output a single electrical pulse having a large pulse width that terminates near the end of the cardiac cycle in which it was initiated, so that any additional input trigger pulse that sometimes is produced by an ectopic cardiac complex in that cardiac cycle has no effect on the single output pulse of the monostable pulse generator means, once that single output pulse is initiated;

iv. a second counting means effective to indicate the number of times it has had an actuating electrical pulse applied to its input; and v. means connecting the output of the monostable pulse generator means to said second counting means, so that the latter means indicates the number of complete cardiac cycles that have occurred, without duplication of count due to any ectopic cardiac complex that may exist in one or more cardiac cycles, whereby the number indicated by the first counting means is the number of normal cardiac cycles, as determined by the combination of elements set forth in claim 4, that have occurred during the period in which occurred the number of complete cardiac cycles indicated by the second counting means.

11. In an apparatus for use in determining the presence and rate of occurrence of cardiac arrhythmias in higher forms of life, the combination of the elements (a) thru (e) as set forth in claim 5, together with f. a fourth circuit means, connected to said input means, for producing a single electrical pulse in the output thereof for each complete cardiac cycle, said fourth circuit means including:

i. differentiating means for accenting the R-wave portion of each cycle relative to the other wave portions of the cycle;

ii. rectifying, amplifying and trigger circuit means for producing in the output thereof an electrical pulse arising from the R-wave portion of each cycle;

iii. monostable pulse generator means connected to the output of the rectifying, amplifying and trigger circuit means for producing in its output a single electrical pulse having a large pulse width that terminates near the end of the cardiac cycle in which it was initiated, so that any additional input trigger pulse that sometimes is produced by an ectopic cardiac complex in that cardiac cycle has no effect on the single output pulse of the monostable pulse generator means, once that single output pulse is initiated;

iv. a second counting means effective to indicate the number of times it has had an actuating electrical pulse applied to its input; and v. means connecting the output of the monostable pulse generator means to said second counting means, so that the latter means indicates the number of complete cardiac cycles that have occurred, without duplication of count due to any ectopic cardiac complex that may exist in one or more cardiac cycles, whereby the number indicated by the first counting means is the number of normal cardiac cycles, as determined by the combination of elements set forth in claim 5, that have occurred during the period in which occurred the number of complete cardiac cycles indicated by the second counting means.

12. In an apparatus for use in determining the presence and rate of occurrence of cardiac arrhythmias in higher forms of life, the combination of the elements (a) thru (f) as set forth in claim 6, together with g. a fifth circuit means, connected to said input means, for producing a single electrical pulse in the output thereof for each complete cardiac cycle, said fifth circuit means including:
  i. differentiating means for accenting the R-wave portion of each cycle relative to the other wave portions of the cycle;
  ii. rectifying, amplifying and trigger circuit means for producing in the output thereof an electrical pulse arising from the R-wave portion of each cycle;
  iii. monostable pulse generator means connected to the output of the rectifying, amplifying and trigger circuit means for producing in its output a single electrical pulse having a large pulse width that terminates near the end of the cardiac cycle in which it was initiated, so that any additional input trigger pulse that sometimes is produced by an ectopic cardiac complex in that cardiac cycle has no effect on the single output pulse of the monostable pulse generator means, once that single output pulse is initiated;
  iv. a second counting means effective to indicate the number of times it has had an actuating electrical pulse applied to its input; and
  v. means connecting the output of the monostable pulse generator means to said second counting means, so that the latter means indicates the number of complete cardiac cycles that have occurred, without duplication of count due to any ectopic cardiac complex that may exist in one or more cardiac cycles, whereby the number indicated by the first counting means is the number of normal cardiac cycles, as determined by the combination of elements set forth in claim 6, that have occurred during the period in which occurred the number of complete cardiac cycles indicated by the second counting means.

13. The method of determining the presence and rate of occurrence of cardiac arrhythmias comprising:
  a. deriving electrocardiogram waves corresponding to cardiac electrical activity including the P-wave, the QRS-complex and the T-wave of each cycle of normal activity;
  b. extracting from said electrocardiogram waves a first single electrical pulse representative of the R-wave, and which has a small pulse width;
  c. converting said first single pulse to a second single electrical pulse having a large pulse width that terminates near the end of the cardiac cycle in which it was initiated;
  d. impressing said second pulses upon a first counter and thereby causing it to sum the number of complete cardiac cycles the waves undergo in a given period of time;
  e. comparing a characteristic part of the R-wave portions of said electrocardiogram with the characteristics of the corresponding R-wave portions of a normal cardiac cycle and then producing a third single pulse if substantial identity exists;
  f. delaying the transmittal of the third single pulse to a time in the cardiac cycle substantially after the termination of the R-wave;
  g. impressing the third pulses upon a second counter and thereby causing it to sum the number of normal cardiac cycles the waves undergo in such given period of time;
  h. extracting from said electrocardiogram waves a fourth single pulse representative of any T-wave in each cycle having excessive amplitude, with the fourth pulse having a polarity opposite to that of the third pulse, and
  i. applying the fourth pulse, when it occurs, to the third pulse to render the third pulse ineffective to register a count in the second counter.

14. The method as set forth in claim 13 which includes also:
  j. extracting from said electrocardiogram waves a fifth single pulse representative of any excessive negative component in each cycle with such fifth pulse having a small pulse width;
  k. converting said fifth single pulse to a sixth single pulse having a prolonged duration that terminates in the latter portion of the same cardiac cycle in which it was initiated, with this sixth pulse having a polarity opposite to that of the third pulse; and
  l. applying the sixth pulse, when it occurs, to the third pulse to render the third pulse ineffective to register a count in the second counter.